United States Patent [19]

Hodgkins

[11] Patent Number: 5,035,729

[45] Date of Patent: Jul. 30, 1991

[54] LIQUID SEPARATION AND RECOVERY APPARATUS FOR FUEL TANK VENT LINE

[75] Inventor: David H. Hodgkins, Modesto, Calif.

[73] Assignee: Parker Hannifin Corporation, Cleveland, Ohio

[21] Appl. No.: 650,396

[22] Filed: Feb. 1, 1991

Related U.S. Application Data

[63] Continuation-in-part of Ser. No. 596,201, Oct. 11, 1990, Pat. No. 5,019,141.

[51] Int. Cl.⁵ .............................................. B01D 19/00
[52] U.S. Cl. .......................................... 55/168; 55/88;
55/170; 137/201; 141/44; 141/303; 220/85 VR;
220/85 VS; 220/86.1
[58] Field of Search ................... 55/88, 165, 168–170,
55/199, 201; 141/44, 45, 286, 343; 137/202;
210/120, 188; 220/85 VR, 85 VS, 86.1

[56] References Cited

U.S. PATENT DOCUMENTS

| 916,425 | 3/1909 | Ellingwood | 141/303 X |
|---|---|---|---|
| 3,981,151 | 9/1976 | Modisette et al. | 62/54 |
| 4,094,346 | 6/1978 | Milo | 141/286 |
| 4,630,749 | 12/1986 | Armstrong et al. | 220/86.1 |
| 4,633,681 | 1/1987 | Webber | 137/202 X |
| 4,715,414 | 12/1987 | Harrison et al. | 141/286 X |
| 4,760,858 | 8/1988 | Szlaga | 220/85 VR X |
| 4,769,050 | 9/1988 | Shaw et al. | 55/171 |
| 4,809,863 | 3/1989 | Woodcock et al. | 220/85 F |
| 4,821,908 | 4/1989 | Yost | 220/86.1 |
| 4,963,169 | 10/1990 | Granville | 55/185 |
| 4,982,757 | 1/1991 | Ohasi et al. | 137/202 |

Primary Examiner—Charles Hart
Attorney, Agent, or Firm—Ralph E. Jocke

[57] ABSTRACT

A fuel tank venting system for a boat (10) includes a fuel tank (12) the interior of which is open to a filler tube (14) and a vent line (18). A liquid separation and recovery device (20) is connected to the vent line and an outlet line (28) which is open to atmosphere. Vapor delivered to the device through the vent line enters an inlet (24) and passes through an opening (64). The vapor then passes through a screen (86), around a sphere (82) that is buoyant in the liquid fuel, and escapes from the device through an outlet (26). When liquid fuel enters the device, the sphere rises blocking flow to the outlet. The trapped liquid passes through an opening (48) into a cavity (42). The liquid entering the cavity displaces a spring loaded piston (56). When liquid is no longer being delivered to the cavity, the piston pushes the liquid back out the inlet and down the vent line to the fuel tank. In excess pressure situations, when liquid is being delivered to the device, a movable member (66) is displaced upward opening a flow path to the outlet of the device through a second chamber (62). Once the over-pressure condition has subsided, the movable member returns to its original condition to prevent the passage of liquid through the device.

19 Claims, 6 Drawing Sheets

LIQUID SEPARATION AND RECOVERY APPARATUS FOR FUEL TANK VENT LINE

CROSS REFERENCE TO RELATED APPLICATION

This application is a continuation-in-part of co-pending U.S. patent application No. 07/596,201 filed Oct. 11, 1990 U.S. Pat. No. 5,019,141.

TECHNICAL FIELD

This invention relates to systems for venting fuel tanks. Particularly, this invention relates to a device which separates liquid from air and vapor in the vent line of a fuel tank and returns the separated liquid fuel to the tank.

BACKGROUND ART

Vehicles powered by internal combustion engines have at least one fuel tank which generally holds a supply of liquid fuel for the engine. The tanks are typically connected to a filler tube which is used to introduce fuel into the tank. The outer opening of the filler tube is usually covered with a removable cap.

When fuel is added to the tank it displaces the air therein. The air, which is laden with fuel vapor, rushes out of the tank as the fuel enters. In many situations, foam is created by agitation of the fuel entering the tank. In some vehicles, the displaced air and foam rushes back out the filler tube as the tank is filled and splashes out on the person filling the tank. Other fuel systems include a vent line which extends from the interior of the tank to atmosphere. The vent line enables air to escape from the tank as it is filled with fuel through the filler tube. The vent line also enables air to enter the tank as fuel is withdrawn for delivery to the engine.

The fuel tank vent line also serves to prevent pressure from building in the tank. If the tank were unvented, increasing temperature of the fuel would cause fuel and vapor expansion which would cause the pressure in the tank to rise. If the pressure became too high, the fuel tank could rupture causing fire or explosion.

Fuel systems used on marine craft usually include a vent line from the fuel tank. The vent line typically opens to the atmosphere over the water. As the fuel tank is filled to near the top, the air flowing out of the vent line can carry fuel and foam overboard on to the water. Wave action which rocks a boat can also cause fuel to be discharged overboard both during fueling and when the tank is full. Fuel discharged overboard poses a pollution hazard and is harmful to wildlife. There is also a risk that fuel floating on the water may catch fire causing injury to life or property.

Government and trade organizations regulate the construction and operation of marine craft. These organizations include the U.S. Coast Guard, the National Marine Manufacturer's Association and the American Boat and Yacht Council. Manufacturers of pleasure boats who have their products approved by the American Boat and Yacht Council comply with standards which cover gas and diesel fuel systems known as H-24 and H-33 respectively. Proposed revisions to these standards include requirements for a fuel vapor separator in the vent line. Such separators must continuously vent the fuel tank to atmosphere while returning liquid fuel which enters the vent line back to the tank. The proposed standards also require that pressure inside the fuel tank not exceed 2.4 p.s.i.g.

A prior art fuel/vapor separator owned by the assignee of the present invention is disclosed in U.S. Pat. No. 4,963,169. This invention is designed to separate liquid from vapor in the vent line and to enable the liquid to flow back into the tank by gravity action. The separator shown in this patent works well but may still be unable to contain a fast moving slug of fuel, resulting in the discharge of fuel overboard.

There are also a number of prior art patents that show devices for separating liquid and recovering vapor. However, none of these are specifically adapted to be installed in a fuel tank vent line to vent the fuel tank to atmosphere while preventing the discharge of liquid fuel through the vent line.

U.S Pat. No. 3,981,156 discloses a vapor recovery system which includes a vapor scrubber that recovers storage tank exhaust vapors in a closed system by absorption in a refrigerated spray. This system avoids exhausting any vapor to atmosphere. The system disclosed in this patent is complex and unsuitable for use in marine fuel tank vent lines.

U.S. Pat. No. 4,769,050 discloses a liquid separator assembly for separating oil from engine crankcase fumes. In the device shown in this patent, an oil fill tube also serves as a crankcase vent tube. A separate vent line is not used in this system because oil is not added to the fill tube at the high rates at which fuel is added to fuel tanks. In addition, lubricating oils do not present the same flammability problems as fuels. As a result, the system shown in this patent would not be suitable for use in a fuel tank venting application.

U.S. Pat. No. 4,809,863 shows a filler neck for an on-board fuel vapor recovery system. The neck assembly has a chamber between the interior of an outer hose and the exterior of a filler tube. Vapor from inside the tank flows through the chamber into a vapor flow passage, and from there into a vapor recovery canister. The vapor passageway has a float and a seat therein which is designed to prevent liquid from reaching the canister. If liquid fuel should backup into the vapor flow passageway, the float will block all flow therethrough. As a result, pressures can build in the tank. This is unacceptable in marine applications for reasons previously discussed.

Thus, there exists a need for a liquid separation and recovery apparatus that can trap liquid fuel in a vent line and return it to the fuel tank while preventing the build up of pressure inside the tank. There further exists a need for a device which can prevent the discharge of fuel in high flow situations and can return the separated liquid to the fuel tank b positive action.

DISCLOSURE OF INVENTION

It is an object of the present invention to provide a device for separating liquid fuel from vapor in a vent line of a fuel tank.

It is a further object of the present invention to provide a device for preventing the discharge liquid through the vent line while enabling the escape of vapor and air from the tank.

It is a further object of the present invention to provide a device for separating liquid fuel in the vent line and holding it for later return to the tank.

It is a further object of the present invention to provide a device that relieves the pressure in the fuel tank in all circumstances when the pressure becomes unduly high.

It is a further object of the present invention to provide a device for separating liquid fuel from vapor and air in a fuel tank vent line that is reliable and low in cost.

It is a further object of the present invention to provide a fuel tank venting system that reduces the likelihood that of liquid fuel is discharged through the vent line.

It is a further object of the present invention to provide a fuel tank venting system that reduces the risk of pressure build up in the fuel tank.

It is a further object of the present invention to provide a fuel tank venting system that retains liquid fuel that enters the vent line and returns it to the tank.

Further objects of the present invention will be made apparent in the following Best Mode for Carrying Out the Invention and the appended claims.

The foregoing objects are accomplished in a system which includes a fuel tank. The tank is connected to a filler tube through which liquid fuel may be added to the tank. A vent line is open to the interior of the tank and is used to vent fluid from the tank. An outlet line connected to atmosphere carries fluid vented out of the tank through the vent line to atmosphere.

The system includes a device for separating liquid from vapor and for returning the separated liquid to the tank. The device has a body with an inlet connected to the vent line and an outlet connected to the outlet line. The device includes a first internal cavity which is in fluid communication with the inlet and the outlet. The cavity is in communication with the inlet and outlet through a first opening at a first end of the cavity. A piston and a rolled diaphragm are mounted for movement in the cavity and are biased by a spring toward the first end of the cavity.

A vapor valve is mounted in the body of the device adjacent to the outlet. The vapor valve serves to prevent the passage of liquid to the outlet while enabling vapor and air to flow therethrough. The vapor valve includes a buoyant sphere positioned below a seat. The seat has an opening. The sphere blocks the opening when it is adjacent thereto. The seat is positioned on a movable member which is movable in a second cavity in the body of the device. The member is movable between a first position wherein fluid may flow to the outlet only through the opening in the seat and a second position. In the second position, fluid may flow to the outlet without passing through the opening. The movable member is biased towards the first position by a spring.

When fuel is added to the tank through the filler tube, air and vapor are displaced from the tank. The air and vapor pass out of the vent line through the device and escape to atmosphere through the outlet tube. If liquid fuel is pushed into the vent line with the air and vapor due to wave action or over filling, it enters the device through the inlet. The liquid inside the device raises the buoyant sphere against the seat and blocks flow to the outlet. As a result, the liquid flows into the first opening and overcomes the force of the spring, moving the piston away from the first end of the cavity.

The liquid is held in the expandable chamber created by displacement of the piston until liquid is no longer being delivered to the device and the pressure in the vent line decreases below the spring force applied by the spring to the piston. The spring then moves the piston to push the liquid out of the expandable chamber through the first opening and out of the device into the vent line. Once in the vent line, the liquid falls by gravity action back into the tank.

In the event the device is filled with liquid, yet the pressure has become dangerously high in the vent line, the buoyant sphere of the vapor valve applies sufficient upward force against the seat to move the movable member to the second position. This enables venting the tank to atmosphere even when liquid is present in the vent line. When the pressure returns to a safe range, the movable member returns to the first position, and the vapor valve continues to function to prevent the discharge of liquid overboard.

BEST MODES FOR CARRYING OUT INVENTION

Figure 1:
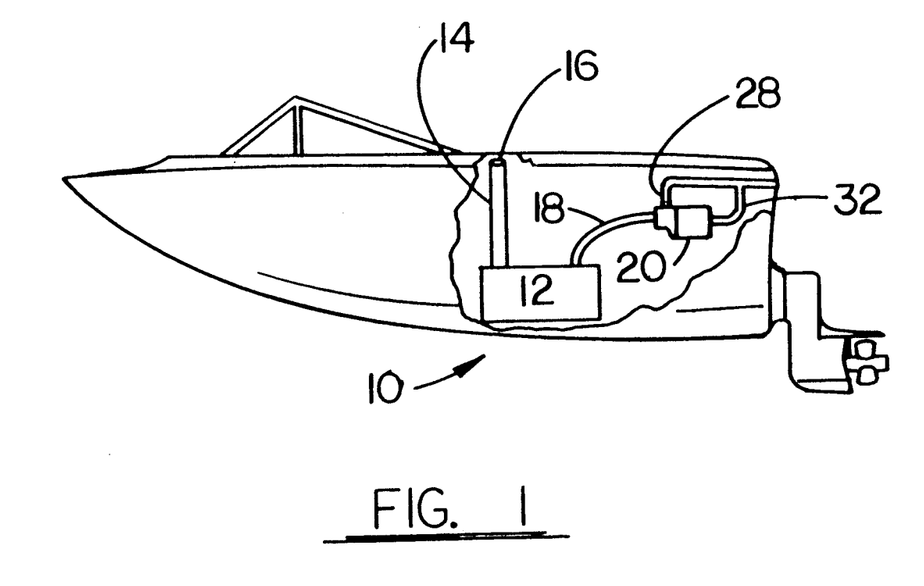
FIG. 1 is a cutaway view of a boat which includes the fuel tank venting system and liquid separation and recovery device of the present invention.

Referring now to the drawings and particularly to FIG. 1, there is shown therein the fuel tank venting system and liquid separation and recovery apparatus of the preferred embodiment of the present invention, installed in a boat generally indicated 10. The system includes a fuel tank 12 of conventional construction for holding a supply of liquid fuel for delivery to an engine which propels the boat. A filler tube 14 is connected to the interior of the tank. The filler tube has an outer opening 16 which is used to add fuel to the tank. Opening 16 is typically covered by a cap of conventional construction.

Figure 2:
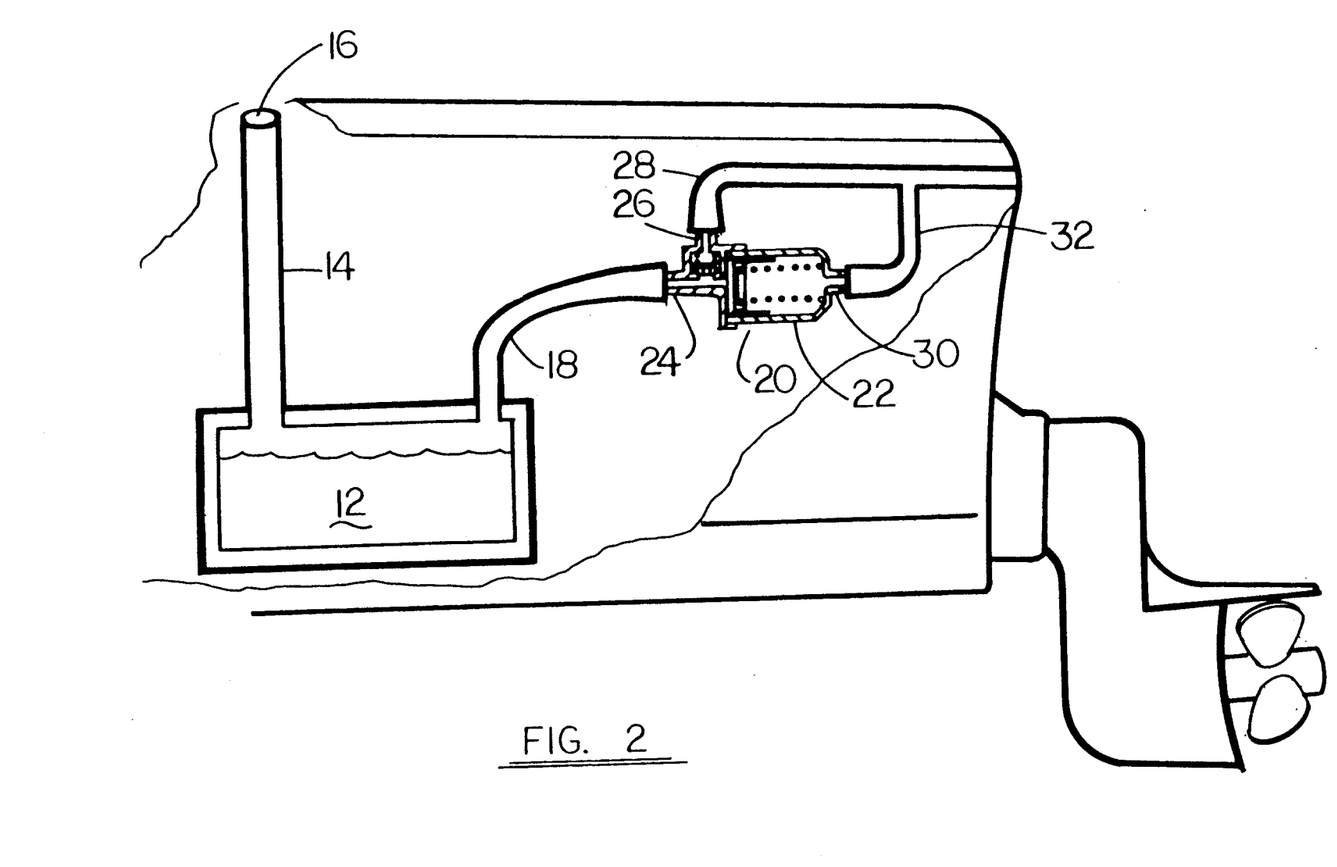
FIG. 2 is an enlarged view of the fuel system shown in FIG. 1 with the liquid separation and recovery device shown in cross section.

The fuel system also includes a vent line 18 which is open to the interior of the tank. As best shown in FIG. 2, the vent line is connected to a liquid separation and recovery device 20 of the present invention. The device 20 includes a body 22 which has an inlet 24. The inlet of the device is in fluid communication with the vent line 18. The device 20 is typically fastened to the boat in a fixed position by a conventional bracket (not shown) so that it is generally oriented as shown in FIG. 2.

The body of the device also has an outlet 26. The outlet is connected to an outlet line 28 which is open to atmosphere. The device also includes a vent outlet 30. Vent outlet 30 is connected to a vent outlet line 32. Vent outlet line 32 is shown connected in fluid communication with outlet line 28. However, in other embodiments it may be open directly to atmosphere.

Figure 3:
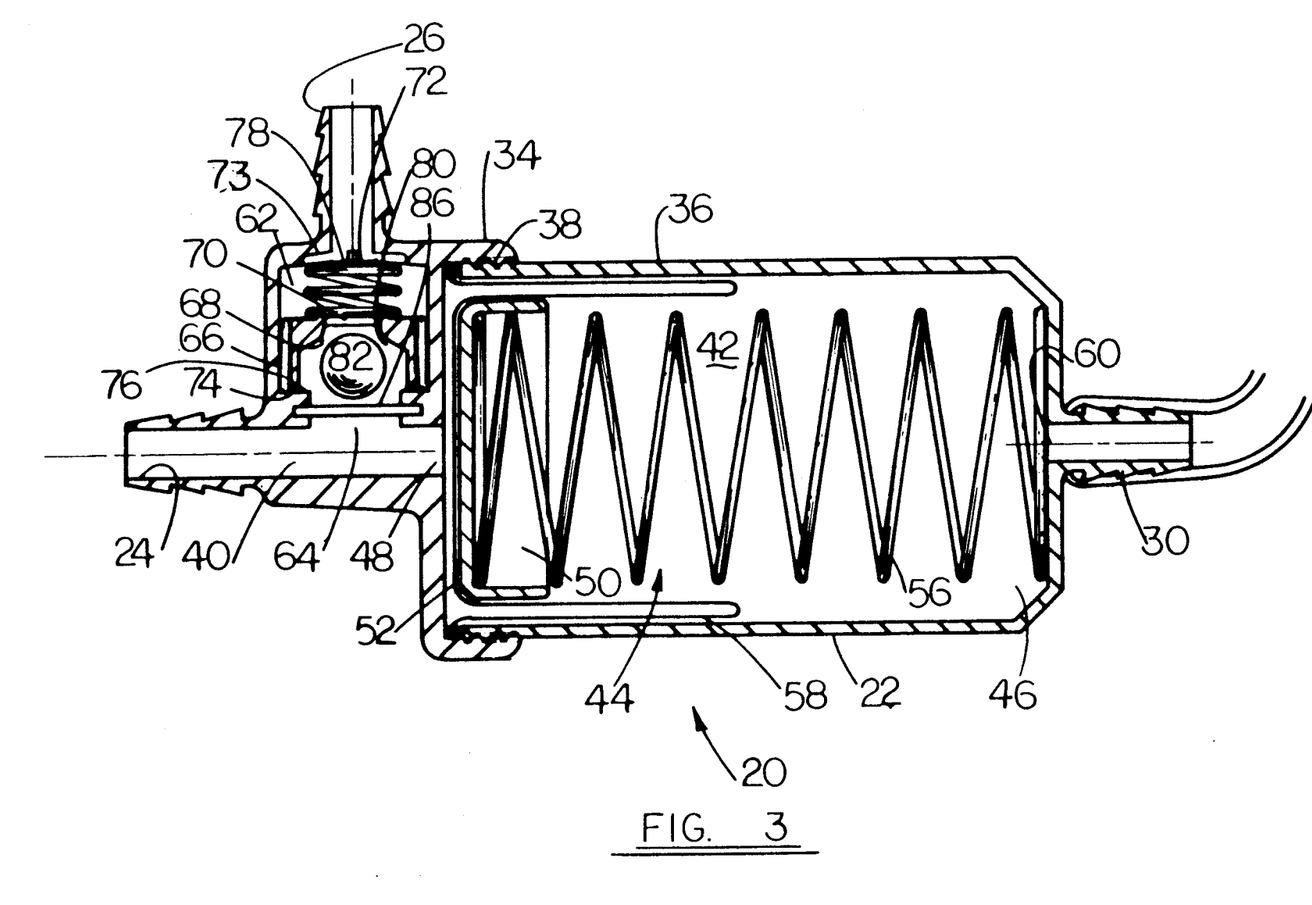
FIG. 3 is a cross sectional view of the preferred embodiment of the liquid separation and recovery device shown in a vapor venting condition.

The liquid separation and recovery device 20 is shown in greater detail in FIG. 3. Body 22 is comprised of a first body portion 34 and a second body portion 36 which are held together by threads 38. The inlet 24 is barbed about its exterior to facilitate attaching a flexible hose thereto. Outlet 26 and vent outlet 30 are similarly barbed as shown.

Inlet 24 opens inside the body of the device to a small chamber 40. Body 20 also includes a large cylindrical cavity 42. Cavity 42 has a first end generally indicated 44 and a second end generally indicated 46. Chamber 40 is open to the first end 44 of the cavity through a first opening 48.

A piston 50 is mounted in cylindrical cavity 42. Piston 50 has a first side 52 and a second side 54. A compression spring 56 biases piston 50 toward the first end of cylindrical cavity 42. A rolled diaphragm 58 extends across cavity 42 and is supported by the first side 52 of the piston. The second side 46 of the cylindrical cavity 42 is open to vent outlet 30 through an opening 60.

Chamber 40 is also open to a second cavity 62 in the body through a second opening 64. A movable member 66 is mounted in second cavity 62 and is movable vertically therein. Movable member 66 is generally u-shaped in cross section and includes seat 68 with a circular flow passage therethrough. Second cavity 62 is open to outlet 26 through an opening 72. Four notches 73 are cut into the body adjacent to opening 72.

Movable member 66 also includes a lower circular face 74. When movable member 66 is in the position shown in FIG. 3, face 74 abuts a sealing surface 76 which extends horizontally adjacent to second opening 64. A compression spring 78 biases movable member 66 downward as shown in FIG. 3 so that its lower face is normally abutting the sealing surface to block fluid flow between the lower face and sealing surface.

Figure 3A:
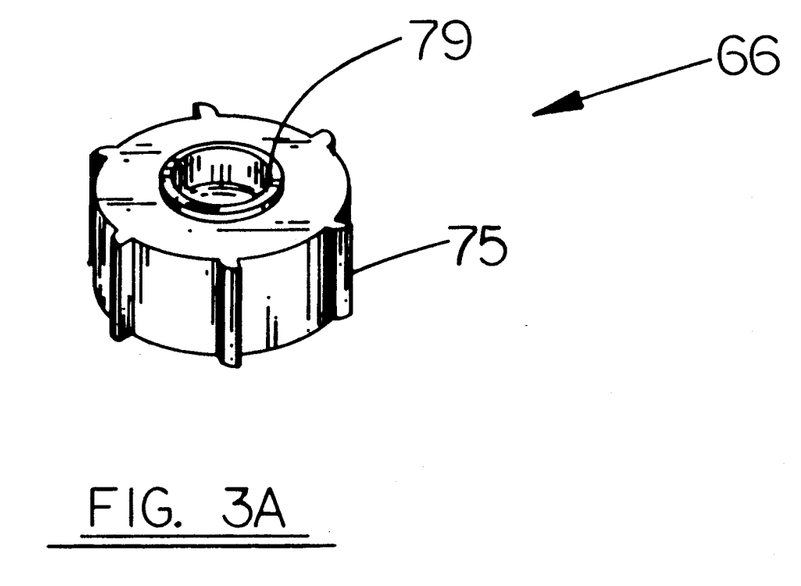
FIG. 3A is an isometric view of the moveable member portion of the present invention.

As shown in FIG. 3A moveable member 66 also has a plurality of radially extending ribs 75 extending about its periphery. It also has a raised ring 79 on its upper surface that aids in positioning spring 78.

A recess 80 is formed in the interior of movable member 66. A sphere 82 is housed in the recess. Sphere 82 is made of buoyant material and is adapted to float in the liquid fuel used in the boat. A screen 86 is mounted in second opening 64 and serves to prevent sphere 82 from falling through the opening.

When fuel tank 12 is filled with fuel through the filler tube 14, the liquid entering the tank displaces the air in the tank. Air and vapor rush out of the tank and flow upward through the vent line 18 into the inlet of the vapor separation and recovery device 20. The air and vapor passes into the device through inlet 24 and enters chamber 40. From chamber 40, air and vapor pass upward through second opening 64 and screen 86.

The air and vapor are of lower density than the liquid fuel. As a result, sphere 82 does not float in the air and vapor and remains disposed below the seat in the movable member as shown in FIG. 3. As a consequence, the escaping gases pass around the sphere through flow passage 70 in the seat, and pass out of second cavity 62 to outlet 26 of the device. From the device, the vapor and air pass to atmosphere through outlet line 28.

In situations other than when the tank is being filled, air and vapor may be required to escape from the tank. The device and system of the present invention also operate to enable this to occur. The fuel tank needs to be vented when the fuel expands due to increasing temperature. In such situations, vapor and air enter the inlet 24 of the device, pass around the sphere 82, pass through the opening in the seat of the movable member and travel out the outlet 26 of the device.

The device also enables air to flow into the fuel tank. This may be required when the fuel in the tank contracts due to decreasing temperature or as fuel is removed from the tank for delivery to the engine. In these situations, air from the atmosphere flows into outlet line 28 and into outlet 26 of the device. Air flows into second cavity 62, through flow passage 70 in the seat of the movable member 66, into chamber 40 and out of the device through inlet 24. From the inlet, air flows into vent line 18 and down into the tank. As will be apparent to those skilled in the art, in normal situations when there is no threat of the discharge of liquid through the vent line, the liquid separation and recovery apparatus of the present invention maintains the fuel tank open to atmosphere.

In circumstances when the fuel tank is being filed rapidly with liquid, there is great turbulence. This turbulence can cause the formation of bubbles and foam in the fuel. The foam is often pushed out the vent line with the escaping air and vapor. If the boat is rocking due to wave action, pure liquid can also be pushed out of the tank through the vent line. Pure liquid and foam can also enter the vent line and be pushed upward due to wave action when the tank has been filled to the top.

Figure 4:
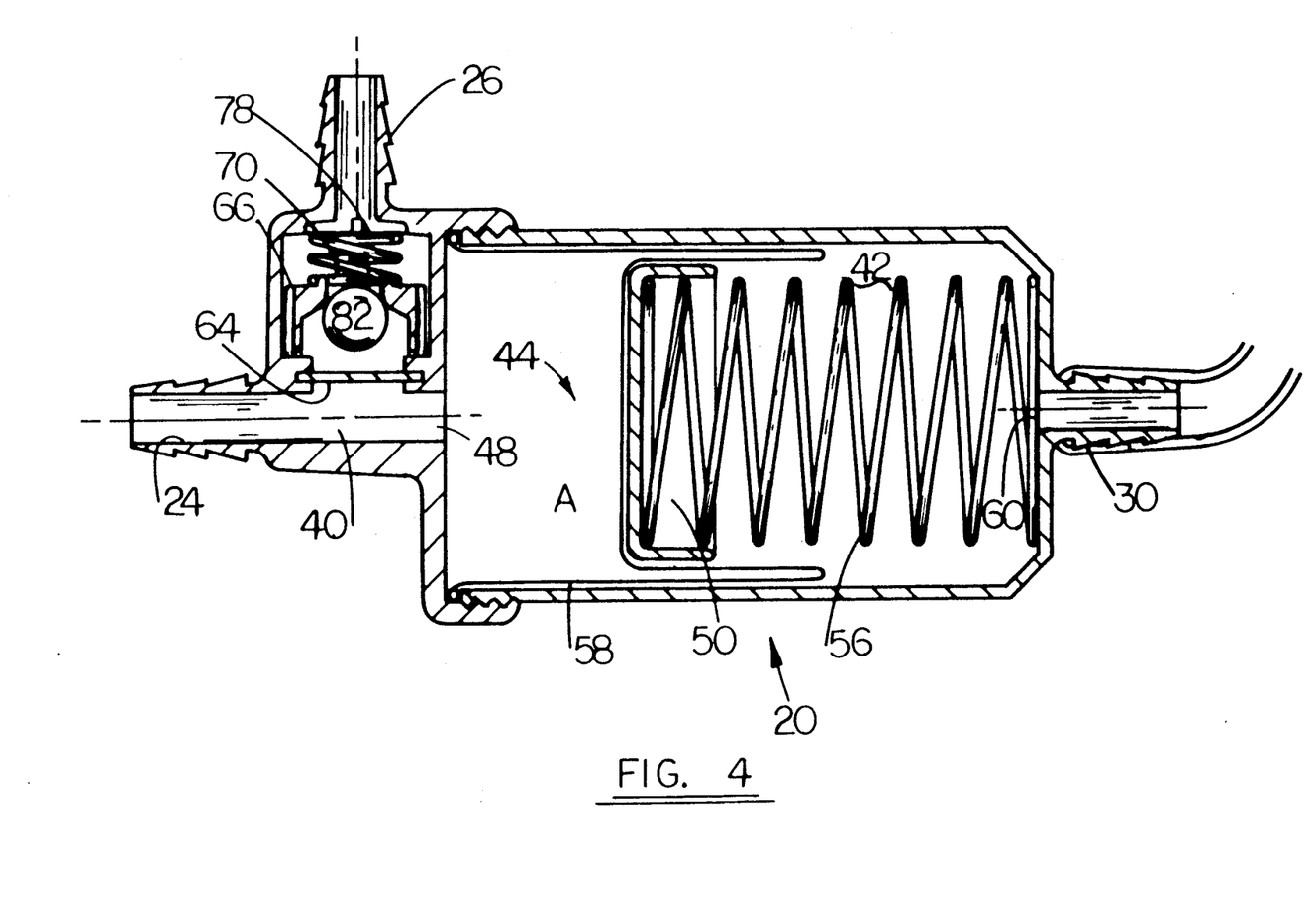
FIG. 4 is a cross sectional view of the liquid separation and recovery device in a liquid accumulating condition.

When liquid or foam is pushed out of the tank through vent line 18, it moves upward until it enters the inlet 24 of the liquid separation and recovery device 20. From the inlet, the liquid enters the chamber 40 and moves upward through second opening 64. This causes sphere 82 to float upward until it blocks the flow passage 70 in movable member 66 as shown in FIG. 4. Thus, the movable member and ball comprise vapor valve means which enables vapor to flow through the device to the outlet while preventing the flow of liquid therethrough. In addition, the screen 86 and the flow path through the small passages between the sphere and the walls of the recess, aid in coalescing the liquid and breaking the foam so that the sphere more readily reacts to the presence of liquid.

When the liquid fuel moves sphere 82 to the position shown in FIG. 4, liquid fuel and vapor is prevented from passing through the device. As a result, the liquid flows from chamber 40 through first opening 48 and into the first end 44 of cavity 42. Because the rolled diaphragm 58 and piston 50 are fluid tight, they act as piston means and are displaced from their original position to the right as shown in FIG. 4. The liquid fuel captured by the device is held in the area labeled "A" in FIG. 4. Area "A" comprises an expandable chamber means which expands in response to the pressure exerted by the liquid fuel being delivered through the first opening 48. As liquid fills chamber 42, the air in the second end 46 of chamber 42 is pushed out opening 60 by displacement of the piston and vents to atmosphere through vent outlet 30.

Once the flow of liquid to the inlet of the device ceases, sphere 82 drops. This enables vapor to escape out of the device through outlet 26. If the pressure at the inlet of the device remains elevated, the liquid continues to be held in cavity 42. Once the pressure in the vent line 18 drops so that the pressure is below the force being exerted on the liquid in area "A" by spring 56, the spring begins to move back towards its original position. As this occurs, air from atmosphere enters chamber 42 through opening 60 and the piston 50 moves to the left as shown in FIG. 4. The liquid in area "A" is pushed back out of the device, down the vent line and into the tank. No liquid will escape from outlet 26 of the device because sphere 82 blocks its escape. Once all liquid has passed out of the device, however, air from atmosphere is enabled to pass through the device into the vent line to enable the fuel to flow all the way back down the vent line into the tank.

In rare instances, a large quantity of liquid may travel up the vent line so that cavity 42 is filled to capacity with liquid fuel.

If further liquid passes up the vent line to the device, the pressure in the vent line and fuel tank can rise above unsafe levels. In addition, there may be brief high pressure "spikes" of pressure which may occur due to slugs of fuel in the vent line. These spikes cause undesirable stresses and may weaken the fuel tank.

To reduce the instances of undesirable high pressure situations, movable member 66 and spring 78 comprise relief valve means for providing for flow through the device when pressure becomes too 10 high even if the device is filled with liquid. As shown in the FIG. 5, if cavity 42 is filled to capacity, any further delivery of liquid to the device will result in increased pressure. Any increase in pressure beyond the force exerted by spring 56 in its fully compressed condition, causes movable member 66 to move upward against the force of spring 78.

Figure 5:
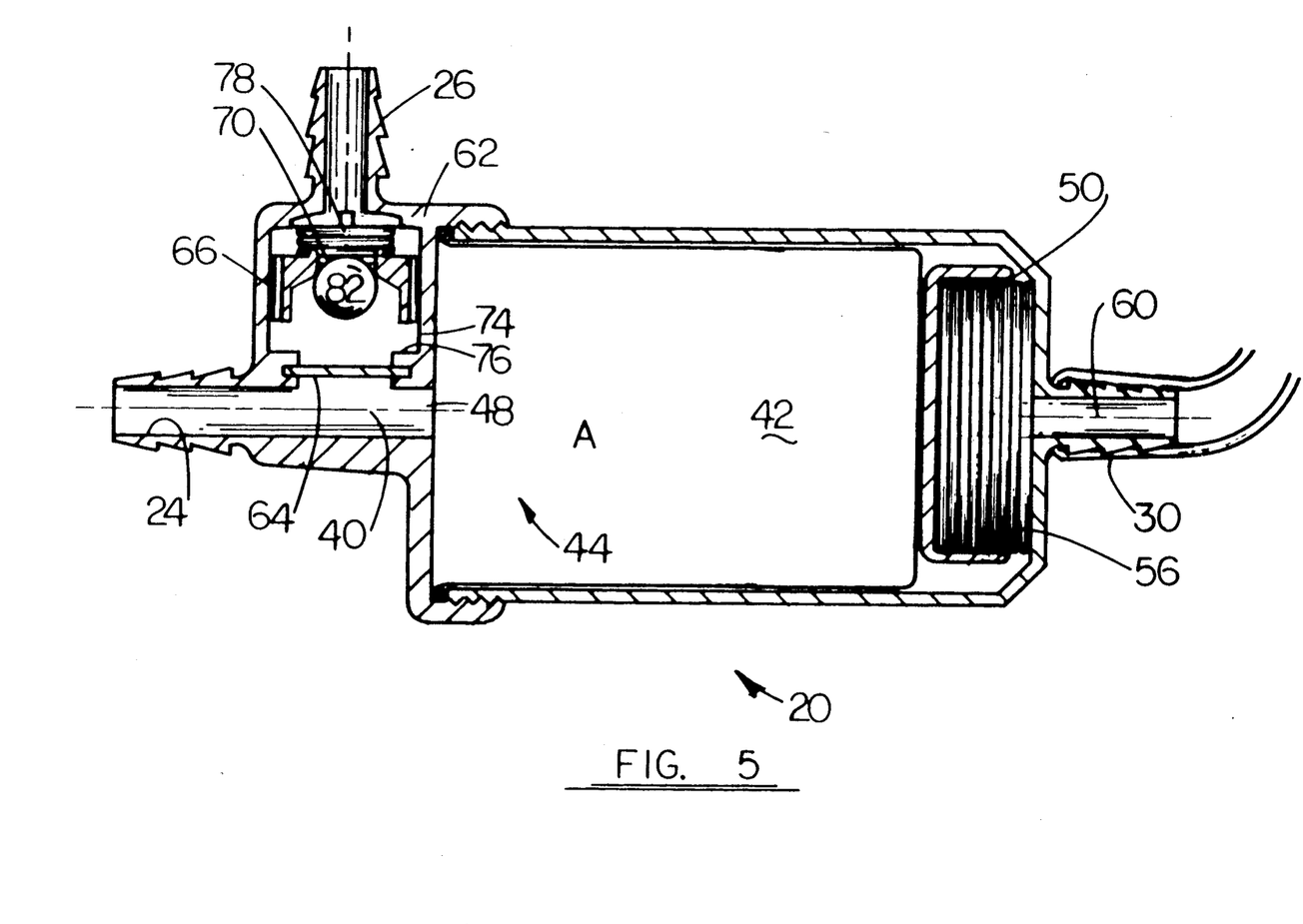
FIG. 5 is a cross sectional view of the liquid separation and recovery device in a pressure relief condition.

When movable member 66 moves upward to the position shown in FIG. 5, lower circular face 74 of the member is disposed away from sealing surface 76. This enables liquid to flow around movable member 66 through second cavity 62 between the ribs 75 on the moveable member. The notches 73 which are positioned adjacent to opening 72, insure that fluid can flow out of second cavity 62 even when spring 78 is fully compressed. From the second cavity, liquid may flow out of the device through outlet 26 until the high pressure condition no longer exists. The movable member then moves downward under the influence of spring 78, until face 74 again abuts surface 76 preventing flow other than through flow passage 70 in seat 68.

Springs 56 and 78 are constructed so that the piston can move to the full extent of its available travel to hold as much fuel as possible in area A before the movable member opens to relieve pressure. In the preferred form of the invention, spring 78 is constructed to relieve pressure at 2.4 p.s.i.g. and above.

The preferred form of the liquid separation and recovery device presents the advantage that it can separate liquid from vapor and can hold the liquid in the device if necessary. The device then automatically delivers the liquid back to the tank by positive action. There is no need for additional piping or tubing to return the recovered liquid back to the tank. As a result, the device is simple and easy to install in existing systems.

Thus, the new liquid separation and recovery apparatus for a fuel tank vent line and fuel tank venting system of the present invention achieve the above stated objectives, eliminate difficulties encountered in the use of prior devices and systems, solve problems and attain the desirable results described herein.

In the foregoing description, certain terms have been used for brevity, clarity and understanding, however, no unnecessary limitations are to be implied therefrom because such terms are used for descriptive purposes and are intended to be broadly construed. Moreover, the descriptions and illustrations given are by way of examples and the invention is not limited to the exact details shown or described.

Having described the features, discoveries and principles of the invention, the manner in which it is utilized and the advantages and useful results obtained; the new and useful structures, devices, elements, arrangements, parts, combinations, systems, equipment, operations, methods and relationships are set forth in the appended claims.

I claim:

1. Apparatus for preventing the discharge of a liquid through a vent line from a tank containing said liquid while enabling vapor to pass therethrough, comprising:
   a body, said body including an inlet and an outlet, the inlet in fluid communication with the vent line from said tank and the outlet in fluid communication with atmosphere,
   said body further including expandable chamber means in fluid communication with said inlet and said outlet for expanding and contracting in area in proportion to fluid pressure;
   vapor valve means adjacent said outlet for enabling vapor to pass therethrough while preventing the passage of liquid;
   whereby when liquid is delivered to said apparatus through said vent line said liquid is prevented from passing through said apparatus by said vapor valve means and said liquid held in said body increases said fluid pressure which expands the area of said expandable chamber means and is held therein until said fluid pressure falls and said liquid is expelled from said expandable chamber means.

2. The apparatus according to claim 1, and further comprising return means for returning liquid expelled from said expandable chamber means to said tank.

3. The apparatus according to claim 2 and further comprising relief valve means in fluid communication with said expandable chamber means and said outlet, for enabling liquid to pass from said inlet to said outlet when a relief pressure is exceeded in said expandable chamber means.

4. The apparatus according to claim 1 wherein said expandable chamber means comprises:
   a cylindrical cavity in said body, said cavity having a first end and a second end, said first end in fluid communication with said inlet;
   a movable piston means in said cavity for preventing the passage of fluid to the second end of said cavity;
   biasing means for biasing said piston means towards said first end of said cylindrical cavity;
   whereby liquid delivered to said apparatus moves said piston means toward the second end of said cavity and said liquid is held in the first end of said cavity; and when said liquid is no longer delivered to said apparatus said biasing means moving said piston means towards said first end of said cavity to return liquid in said cavity to said tank through said vent line.

5. The apparatus according to claim 4 wherein:
   said body includes a first opening to said first end of said cavity, said first opening in fluid communication with said inlet;
   said piston means includes a first side adjacent said first end of said cavity and a second side adjacent said second end of said cavity;
   and said apparatus further comprising:
   expandable membrane means for preventing the passage of fluid therethrough, said membrane means intermediate of said first opening and said piston means, said first side of said piston means supporting said membrane means.

6. The apparatus according to claim 5 and further comprising;
vent outlet means for enabling air to escape from the second end of said cavity upon movement of said piston means towards said second end.

7. The apparatus according to claim 6 wherein said vent outlet means is vented to atmosphere.

8. The apparatus according to claim 7 wherein the outlet of said apparatus is in fluid communication with an outlet line and said vent outlet means is in fluid communication with said outlet line.

9. The apparatus according to claim 6 and further comprising:
relief valve means in fluid communication with said inlet and said outlet, for enabling liquid to pass from said inlet to said outlet when a relief pressure is exceeded.

10. The apparatus according to claim 9 wherein said body further comprises a chamber, said chamber in fluid communication with said inlet, said outlet and said first opening to the first end of said cylindrical cavity;
said apparatus further comprising:
a second opening from said chamber to said vapor valve means, said vapor valve means including:
an impermeable body buoyant in said liquid; and
a seat located vertically above said buoyant body, said seat intermediate said second opening and said outlet, said seat having a flow passage therein, said buoyant body sized for blocking said flow passage;
whereby said buoyant body blocks fluid flow through said flow passage in said seat when liquid enters said vapor valve means and prevents liquid flow to said outlet.

11. The apparatus according to claim 10 wherein said buoyant body is a sphere and said flow passage is a circular opening therethrough.

12. The apparatus according to claim 11 and further comprising a screen in said second opening.

13. The apparatus according to claim 11 wherein said relief valve means comprises:
a movable member, said seat and opening therethrough on said movable member;
a relief passage extending through said body and adapted for passing fluid from said second opening to said outlet;
and
wherein when said buoyant body blocks flow through said opening, said relief pressure moves said movable member to open said relief passage enabling liquid to pass to the outlet therethrough.

14. The apparatus according to claim 13 wherein said body further comprises:
a second cavity vertically above said second opening, said second cavity sized for enabling movement of said movable member therein, said second cavity bounded by a sealing surface adjacent said second opening;
and wherein said movable member includes a recess sized for holding said buoyant body vertically below said seat while enabling vapor to flow through said recess;
said movable member further including a face, said face adjacent said sealing surface and preventing the flow of fluid from said second opening to said second cavity when said face of said movable member is in a first position abutting said sealing surface; and,
spring means for biasing said movable member to the first position;
whereby when said seat is blocked by said buoyant body due to liquid in said apparatus said relief pressure moves said movable member to enable liquid to pass to said outlet through said second cavity.

15. The apparatus according to claim 14 and further comprising a screen in said second opening.

16. A fuel tank venting system for a vehicle comprising:
a fuel tank;
a filler tube open to said fuel tank for delivering fuel to said tank;
a vent line in fluid communication with said fuel tank for venting fluid from said tank;
an outlet line to atmosphere;
and
a liquid return apparatus comprising:
an inlet in fluid communication with said vent line;
an outlet in fluid communication with said outlet line;
expandable chamber means in fluid communication with said inlet and said outlet for expanding and contracting in area in proportion to fluid pressure;
vapor valve means adjacent said outlet for enabling vapor to pass to said outlet of said apparatus while blocking the passage of liquid;
whereby when liquid is delivered to said apparatus through said vent line, said liquid is prevented from passing to said outlet by said vapor valve means and the liquid held in said body increases said fluid pressure which expands the area of said expandable chamber means and is held therein until said liquid pressure falls and said liquid is expelled from said expandable chamber means.

17. The fuel tank venting system according to claim 16 wherein said liquid return apparatus further comprises relief valve means in fluid communication with said expandable chamber means and said outlet for enabling liquid to pass from said inlet to said outlet when a relief pressure is exceeded.

18. The fuel tank venting system according to claim 17 wherein said liquid return apparatus has a body and said expandable chamber means comprises:
a cylindrical cavity in said body, said cavity having a first end and a second end, said first end in fluid communication with said inlet;
a movable piston means in said cavity for preventing the passage of fluid to said second end;
biasing means for biasing said piston toward said first end of said cylindrical cavity;
whereby liquid delivered to said apparatus displaces said piston in said cavity toward said second end and said liquid is held in said cavity, and when said liquid is no longer delivered to said apparatus, said biasing means moves said piston toward said first end expelling said liquid from said cavity and returning said liquid to said tank through said vent line.

19. Apparatus for preventing the discharge of a liquid through a vent line from a tank containing said liquid while enabling vapor to pass therethrough, comprising:
a body, said body including an inlet and an outlet, the inlet in fluid communication with the vent line from said tank and the outlet in fluid communication with atmosphere;

said body further including expandable chamber means in fluid communication with said inlet and said outlet for expanding responsive to fluid pressure;

vapor valve means adjacent said outlet for enabling vapor to pass therethrough while preventing the passage of liquid; and separating means positioned in said body between said inlet and said outlet for separating liquid from vapor delivered from said tank;

whereby liquid is prevented from passing through said apparatus by said vapor valve means and said liquid expands expandable chamber means and is held therein.

* * * * *